United States Patent [19]
Bradshaw et al.

[11] Patent Number: 5,168,202
[45] Date of Patent: Dec. 1, 1992

[54] MICROPROCESSOR CONTROL OF ELECTRIC MOTORS

[75] Inventors: Scott G. Bradshaw, Chester, VA; Jesse C. Frye, Cliffside, N.C.

[73] Assignee: Platt Saco Lowell Corporation, Greenville, S.C.

[21] Appl. No.: 752,375

[22] Filed: Aug. 30, 1991

[51] Int. Cl.$^5$ .............................................. H02P 5/40
[52] U.S. Cl. .................................. 318/608; 318/809; 318/701
[58] Field of Search ............... 318/608, 685, 723, 809, 318/603, 605, 632, 696, 254, 439, 138, 701

[56] References Cited

U.S. PATENT DOCUMENTS

| | | | |
|---|---|---|---|
| 4,072,884 | 2/1984 | Treadwell | 318/608 |
| 4,608,527 | 8/1986 | Glennon et al. | 318/685 |
| 4,835,448 | 5/1989 | Dishner et al. | 318/254 |
| 4,843,291 | 6/1989 | Predina | 318/605 |
| 4,933,620 | 6/1990 | MacMinn et al. | 318/696 |
| 4,937,508 | 6/1990 | Rozman | 318/254 |
| 4,942,344 | 7/1990 | Devitt et al. | 318/254 |
| 4,954,764 | 9/1990 | Kim | 318/798 |

FOREIGN PATENT DOCUMENTS

2229457A 9/1990 United Kingdom .
2229458A 9/1990 United Kingdom .

OTHER PUBLICATIONS

IEE Power Electronics & Variable-Speed Drives Conference, London, Jul. 1988; paper entitled "Four-Quadrant Brushless Reluctance Motor Drive," T. J. E. Miller, et al. published Jul. 1988 (4 pages).

IEE Power Electronics & Variable-Speed Drives Conference, London, Jul. 1990; paper entitled "A New Control IC For Switched Reluctance Motor Drives," T. J. E. Miller, et al. published Jul. 1990 (5 pages).

Primary Examiner—William M. Shoop, Jr.
Assistant Examiner—John W. Cabeca
Attorney, Agent, or Firm—Luke J. Wilburn, Jr.

[57] ABSTRACT

Method and apparatus for closed-loop microprocessor control of an electric motor having one or more phase windings and commutation of the phases by rotor/stator position sensors to provide improved efficiency in motor operation wherein the conduction angle of a phase energization of the motor at a given speed of operation is measured, the phase advance adjusted in a positive or negative direction to obtain a subsequent conduction angle, and the two sequential conduction angles compared. Based on the comparison, further phase advance and comparison of sequentially measured conduction angles is carried out, in positive or negative directions of phase advance, to maintain a minimum conduction angle and improve operating efficiency of the motor.

11 Claims, 12 Drawing Sheets

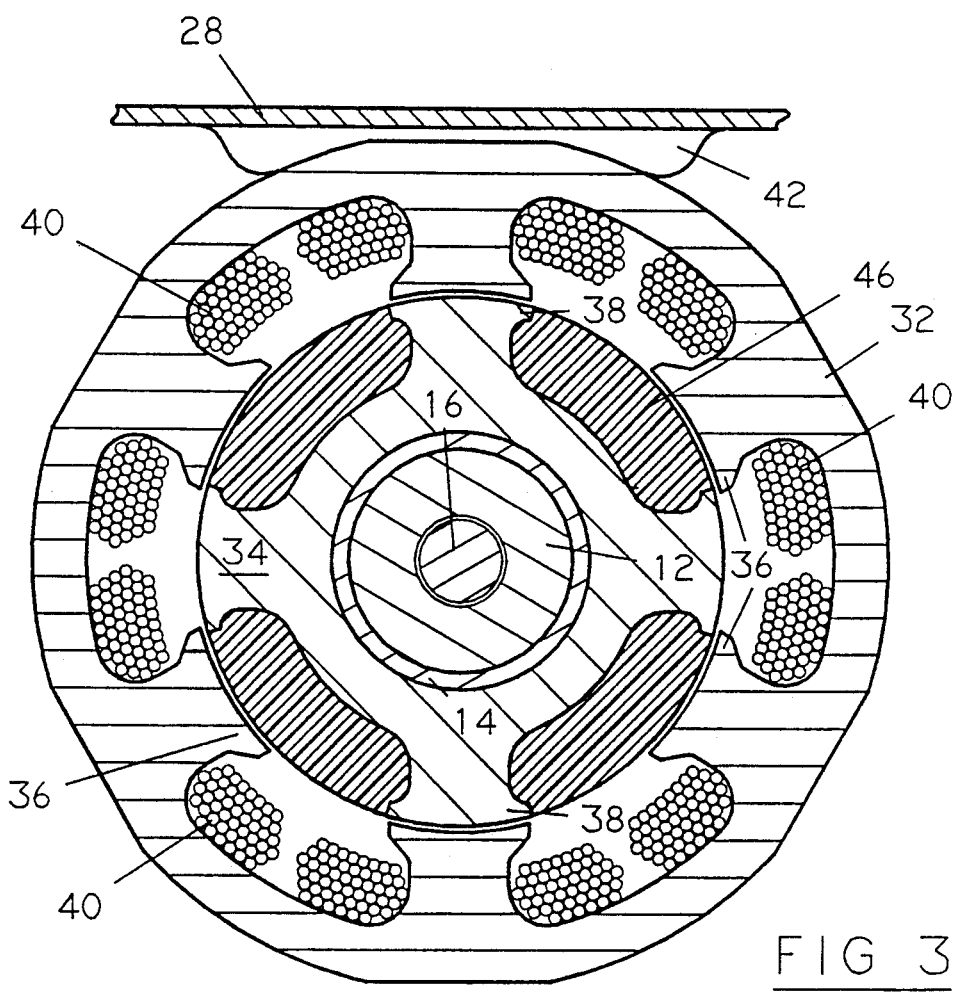

MICROPROCESSOR CONTROL OF ELECTRIC MOTORS

This invention relates to the control and operation of electric motors and, more particularly, to method and apparatus for closed-loop microprocessor control of brushless DC motors to provide improved efficiency in motor operation.

BACKGROUND OF THE INVENTION

Brushless DC motors without permanent magnets often are interchangeably referred to as switched reluctance (SR) or variable reluctance (VR) motors. Reference to a VR motor herein is intended to include both terminologies. A VR motor has two sets of salient poles, one set on the stator which has phase windings around the poles and another set on the rotor which has no windings. The stator phase windings are sequentially energized with current pulses to rotate the rotor which is connected to a shaft output. The stator phase windings are sequenced, or commutated, by signals from a rotor position sensor. The rotor position sensing means may comprise optical sensors or magnetic sensors of the Hall effect type. The sensors typically are mounted in fixed position on the stator or motor housing adjacent the path of rotation of the rotor, and the sensed means are fixed for rotation with the rotor.

In a typical three-phase, VR motor, three Hall effect sensors may be located 120° arcuately apart, centered about the rotor shaft, and are fixed either directly to the stator or to some fixture which locates them according to some known relationship with respect to the stator. A magnetic ring with four North regions and four South regions alternating in 45° radial arcs of the ring are attached to the rotor or rotor shaft and serve as sensed means so that when the rotor rotates, sensor output signals can be used to directly commutate, i.e., cut on and off, the current to each of the motor phase windings as they locate each and every pole alignment.

VR motors have been proposed for driving the individual spindle assemblies of a textile yarn ring spinning frame. In such spindle assemblies, the rotor of the motor is mounted on the spindle shaft which supportably rotates a yarn collection member, such as a bobbin, during the spinning operation. A ring rail with ring and traveler reciprocates vertically along the support bobbin to wind the yarn package. The lower end of the spindle support shaft is supported for rotation in a bolster section which has an outer housing mounted in fixed position to a spindle assembly support rail of the spinning frame. The stator of the VR motor is disposed in surrounding relation to the rotor and is mounted in fixed position in a housing supportably attached in suitable manner to the bolster housing or support rail of the ring spinning frame.

It is known to provide control systems for adjusting various parameters of motor operation of a VR motor, such as speed, torque, phase commutation, phase advance, and efficiency of the motor. Certain of such systems employ analog or digital memory to store optimum control parameters relating to switching angles to demand speed and operating torque. Certain other control systems employ theoretical equations derived to predict optimum phase advance as a function of speed.

U.S. Pat. No. 4,835,448 discloses a method by which a phase advance control signal is used to control motor torque. The phase advance signal may be adjusted to provide an optimum efficiency of the motor.

U.S. Pat. No. 4,954,764 discloses a method and circuit for power efficiency improvements where a PWM waveform is adjusted to provide minimum current to an AC induction motor. Several PWM waveforms are used to operate the motor and the resulting current values are stored in memory. This sequence is repeated until a minimum current value is found according to variation of loading of the motor. This technique dynamically seeks the optimum operating point of the motor and uses current measuring equipment to determine actual efficiency.

U.S. Pat. No. 4,942,344 describes apparatus and method for controlling the amount of torque angle shift in a brushless motor. The stator winding voltage level is continuously monitored to determine the amount of torque angle shift to be implemented. This technique dynamically seeks the optimum operating point of the motor and uses stator voltage measuring equipment to determine actual efficiency.

BRIEF OBJECTS OF THE INVENTION

It is an object of the present invention to provide an improved method of control of a VR motor.

It is another object to provide improved apparatus for motor control of a VR motor.

It is a more specific object to provide method and apparatus for improved control of a VR motor comprising a closed-loop system is employed for adjusting various parameters of motor operation.

It is a further specific object of the present invention to provide method and apparatus for motor control of a VR motor to facilitate optimum efficiency of operation of the motor by monitoring the conduction angle, or pulse width, of the current supplied to commutate the phase windings of the motor and to automatically continuously adjust the phase advance of the conduction angle to facilitate the maintenance of a minimum conduction angle, or pulse width, and optimum efficiency of the motor during motor operation.

BRIEF DESCRIPTION OF THE DRAWINGS

The above listed objects as well as other objects of the present invention will become more apparent and the invention will be better understood from the following detailed description of preferred embodiments of the invention, when taken together with the accompanying drawings, in which:

FIG. 3 is a horizontal cross-sectional view of the spindle assembly, taken generally along Line III—III of FIG. 2a and looking in the direction of the arrows;

SUMMARY OF THE INVENTION

Figure 1:
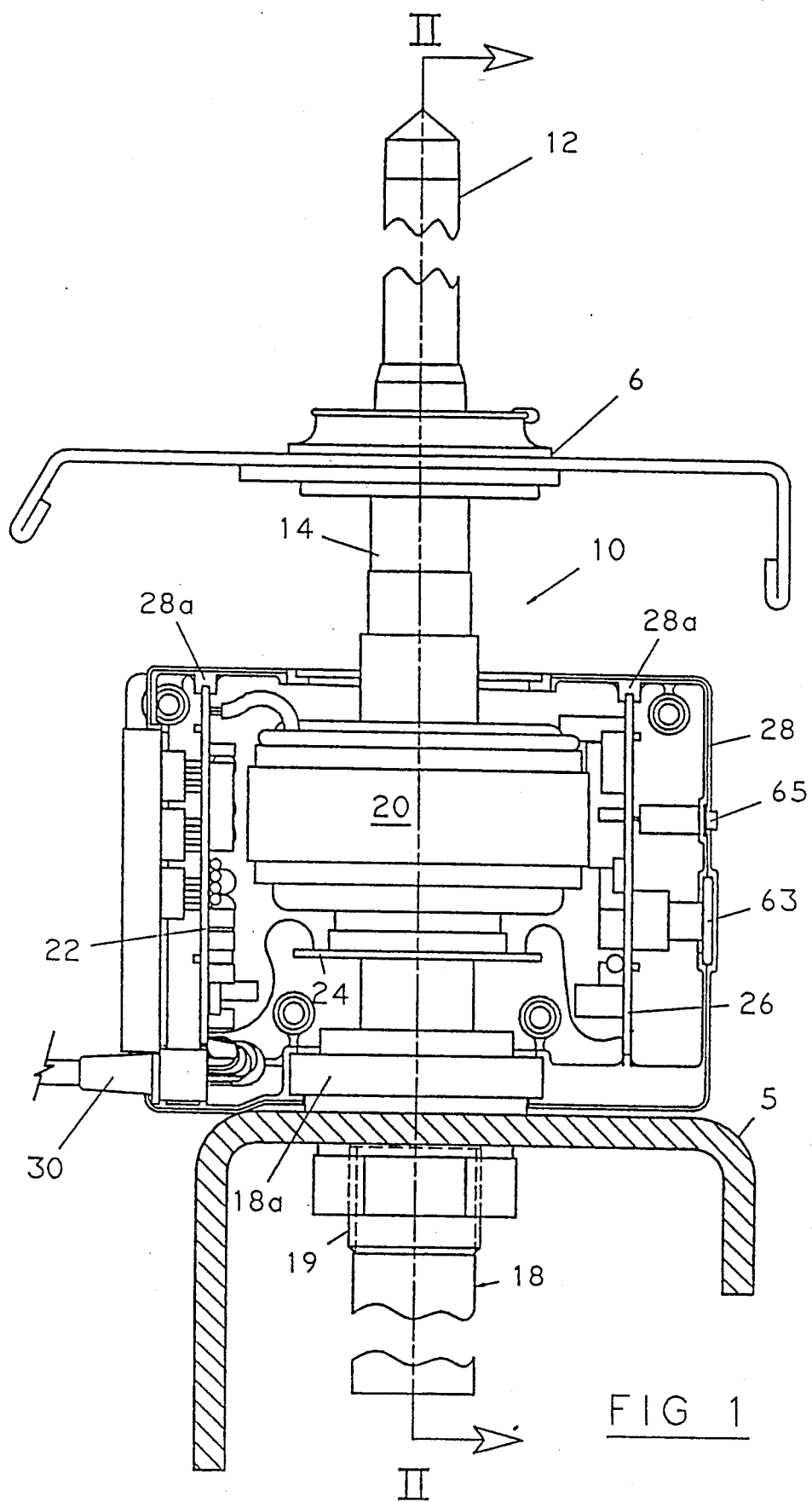
FIG. 1 is an elevation view of a motor-driven spindle assembly of a textile ring spinning frame, with a side cover plate of the spindle motor housing removed to show the motor and motor control circuit boards located in the housing.

The present invention is directed to method and apparatus employing closed-loop microprocessor control for a variable reluctance motor. A rotor position sensor provides waveforms to the microprocessor which generates signals used to control the switching of current to the phase windings of the motor. These control signals generated by the microprocessor have two states, on and off. The duration of the on state is identified herein as the conduction angle, or pulse width. The conduction angle supplied to control the current to the phases of the motor during commutation may be continuously monitored and the phase advance of the conduction angle continuously adjusted in response thereto during motor operation to attempt to maintain a minimum conduction angle. The phase advance which gives the smallest conduction angle is continously updated by the control loop, and the conduction angle is used as a measure of motor efficiency. The conduction angle was chosen to estimate efficiency because it is readily available in the system and because it is related to the motor copper losses.

The efficiency optimization algorithm for carrying out the method may be implemented as a subroutine in a closed-loop velocity control section of the microprocessor with program stored in program storage means, such as a ROM or EPROM. More specifically, this subroutine may be executed at desired intervals, e.g., every millisecond, and the inputs are phase advance and conduction angle. The conduction angle may be accumulated and stored for desired intervals, e.g., 250 milliseconds, and this sum compared to a previously stored 250 millisecond conduction angle sum. Incremental adjustments of some degree are made to the phase advance every 250 milliseconds, based on the result of the comparison of two sequential measurements of the conduction angle. In one embodiment, if the conduction angle increases between two sequential measurements, then the phase advance is made in a direction opposite from the preceding incremental adjustment. If there is a decrease or no change in the conduction angle between two sequentially measured conduction angles, then the incremental phase advance is further adjusted in the same direction as the previous direction of adjustment.

After completion of each 250 millisecond comparison and phase advance adjustment, the previous conduction angle is replaced with the subsequent conduction angle so that a new subsequent conduction angle may be accumulated and the process continued. This efficiency optimization algorithm continues to operate, constantly seeking a phase advance which will minimize the conduction angle and therefore maximize motor efficiency.

It should be noted that if no change in conduction angle occurs between two sequential measurements of the conduction angle, then no improvement in motor efficiency is achieved; however, the method of the present invention, to maintain continuity, applies a phase advance after every comparison of sequential conduction angles. This can be accomplished in the aforementioned one embodiment by programming the subroutine to continue phase advance in the same direction of adjustment upon measurement of a "no change," as above described, or, in a second embodiment, to reverse direction of adjustment of the phase advance when a "no change" comparison occurs, so as to ensure a phase advance change each time sequential conduction angle measurements are compared.

DETAILED DESCRIPTION OF PREFERRED EMBODIMENTS

Referring more particularly to the drawings, FIG. 1 is an elevation view of a motor-driven spindle assembly 10, such as may be employed at each winding position on a textile ring spinning frame. Such a spinning frame is schematically illustrated in FIG. 1 and includes a support member 5 of a ring spinning frame, and a vertically reciprocatable ring rail, ring, and traveler 6.

Figure 2:
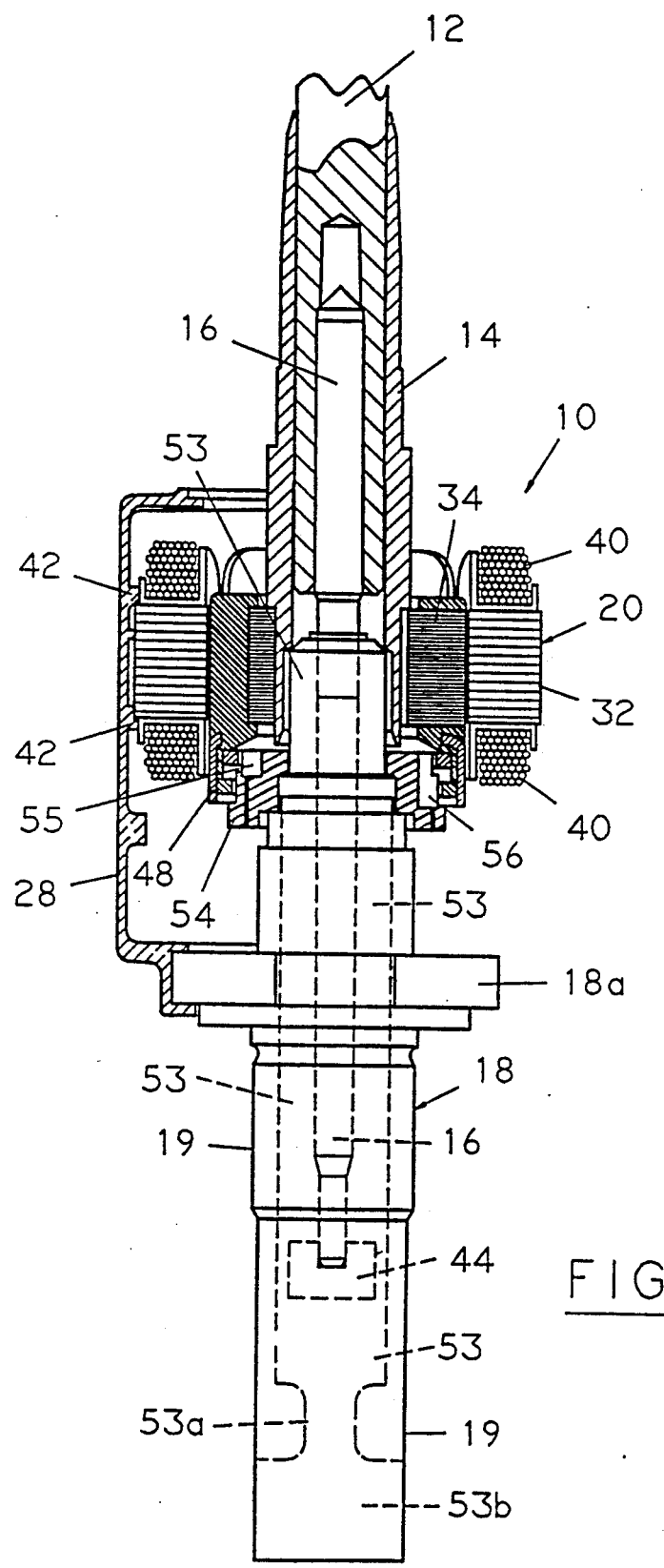
FIG. 2 is a left side, partial elevation view of the motor-driven spindle assembly as seen in FIG. 1, with portions of the spinning frame elements, motor housing, and the circuit boards removed, and with portions of the motor and housing shown in vertical section taken generally along Line II—II of FIG. 1.
Figure 2A:
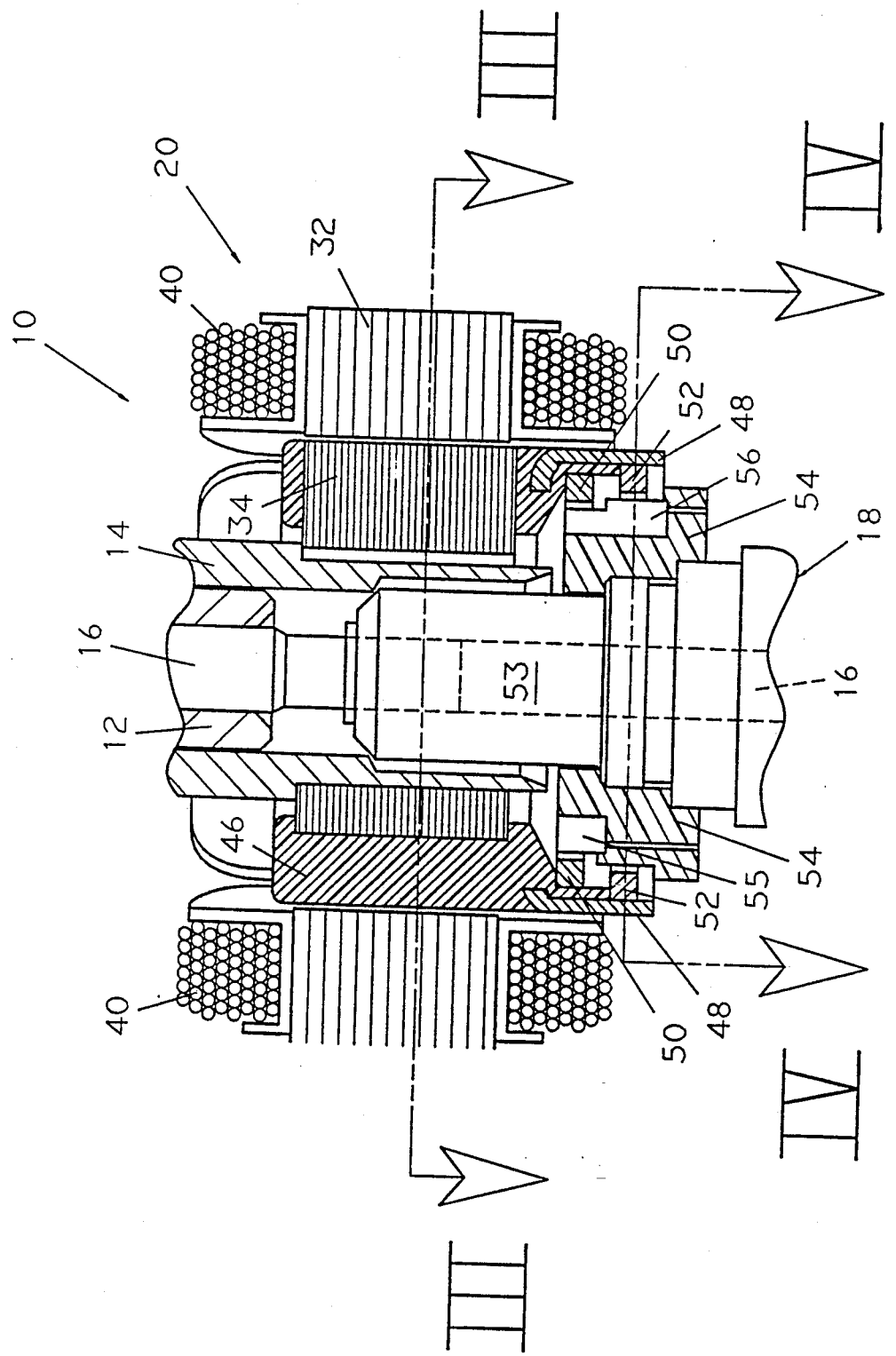
FIG. 2a is an enlarged view of a central portion of the vertical section view of the spindle assembly seen in FIG. 2.

As shown in FIGS. 1, 2, and 2a, the spindle assembly 10, portions of which have been removed for convenience, includes yarn package-receiving means comprising shaft means including a sheath 12, a rotor sleeve 14, and a spindle blade 16 mounted for rotation in a supporting bolster section 18. Bolster section 18 includes an outer housing 19 which is mounted in fixed position on horizontal support member 5 of a spinning frame. Surrounding the rotational axis of the spindle assembly are the conventional ring rail package builder 6 and shaft means drive means which includes a VR motor 20. Motor 20, and motor control means, the components of which are mounted on electrically connected electronic circuit boards 22, 24, and 26, are located in a protective housing 28 which is supportably attached in fixed position to a flange portion 18a of the bolster section.

As seen in FIG. 1, circuit boards 22 and 26 are supportably mounted in trackways 28a of the housing and circuit board 24 is supportably mounted on an upper end portion of bolster section 18 in spaced relation to the lower end of motor 20. The motor and motor control system components located on the circuit boards receive power and further control signals from a power supply and a master controller for the ring spinning frame (not shown), through a power and communication supply line 30.

FIG. 2 is a left side elevation view of the spindle assembly of FIG. 1, with circuit boards and portions of the motor housing removed. Portions of the motor 20, sheath 12, and rotor sleeve 14 are shown in vertical section. Referring to FIGS. 2, 2a, and 3, the VR motor 20 comprises a stator 32 and rotor 34. Stator 32 is composed of laminated sheets of steel and has six salient inwardly facing poles 36. Rotor 34 is composed of laminated steel sheets and has four outwardly facing salient poles 38 (FIG. 3). Stator poles 36 are provided with phase windings 40, with radially opposed pairs of salient stator poles being wound in series to form a three-phase motor. The phase windings of the stator are sequentially energized with current pulses to create a magnetic field and attract the rotor poles adjacent thereto, causing rotation of the rotor, rotor sleeve, and sheath.

As best seen in FIGS. 2 and 3, the stator is supported in fixed position in the motor housing 28 on inwardly protruding stator support ledges 42 of the housing. Rotor 34 of the motor is supportably mounted for rotation inside the stator through its fixed attachment to rotor sleeve 14 which is fixed for rotation with the sheath 12. Sheath 12 is in turn fixed for rotation with blade 16, the lower end which is supported for rotation in a bearing cup 44 located in a lower portion of bolster section 18.

Spaces between salient rotor poles are filled with nylon plastic material 46 (FIGS. 2a and 3) in which a metal ring 48 is supportably embedded for rotation with rotor 34. Adhesively secured within metal ring 48 are upper and lower magnetic rings 50, 52. Magnetic rings 50, 52 thus rotate with rotor 34 about the central longitudinal axis of the spindle assembly during motor operation.

Figure 4:
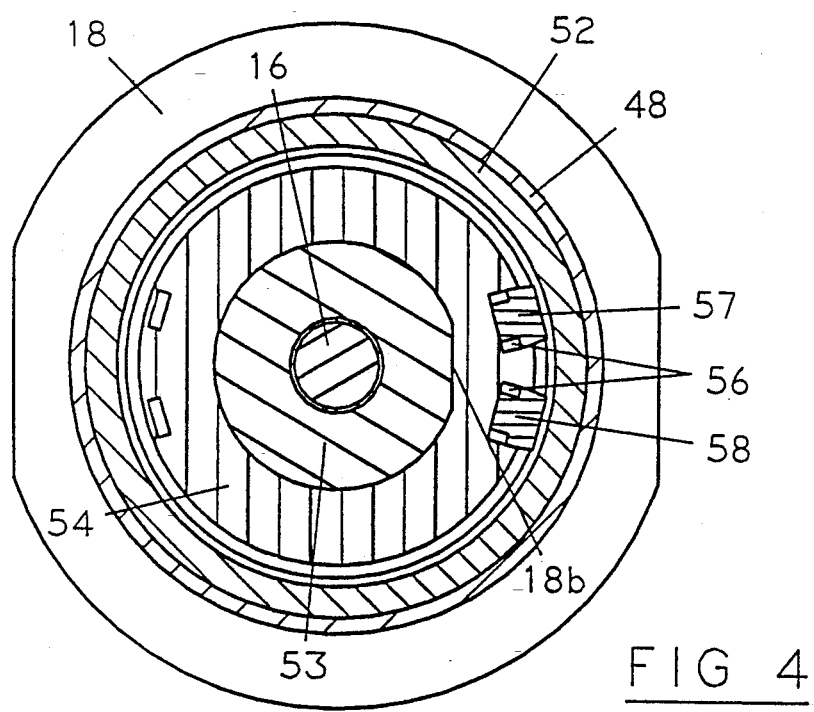
FIG. 4 is a horizontal cross-sectional view of the spindle assembly, taken generally along Line IV—IV of FIG. 2a and looking in the direction of the arrows.

Fixedly mounted to an upper end portion of an internal sleeve member 53 of bolster section 18 is a molded plastic ring 54 which serves to support sensing means which operate in conjunction with the rotating magnetic rings 50, 52 to provide signal information for velocity control and communication of the motor phase windings, respectively. Support ring 54 is positively fixed in its angular position surrounding an upper end portion of sleeve member 53 of bolster section 18 by mating, flattened sections, seen at 18b, on the sleeve member 53 and ring 54 (FIG. 4). Located in vertically spaced, horizontal planes in support ring 54 are arcuately disposed pairs of pockets 55, 56 (one of each pair seen in FIG. 2a). Each of the two pairs of pockets receive and positively fix the position of sensing means, such as conventional, latched Hall effect sensors, on sleeve 53. Two Hall effect sensors (not shown in pockets in FIG. 2a) are located in two 30° arcuately spaced pockets 55 adjacent the upper magnetic ring 50 for velocity sensing. Two Hall effect sensors 57, 58 (FIG. 4) are correspondingly located in 30° arcuately spaced pockets 56 adjacent the lower magnetic ring 52 to sense the passage of alternating magnetic poles of ring 52 for commutation of the motor phase windings. (See FIGS. 2a, 4, and 5).

Details of the means for mounting the sensing means on the upper end of sleeve member 53 and relative to the path of rotation of the magnetic rings 50, 52 during motor operation form the subject matter of a commonly assigned co-pending application entitled "Improved Motor Driven Spindle Assembly for Ring Spinning," Ser. No. 07/752,377 filed Aug. 30, 1991 concurrently herewith.

Figure 5:
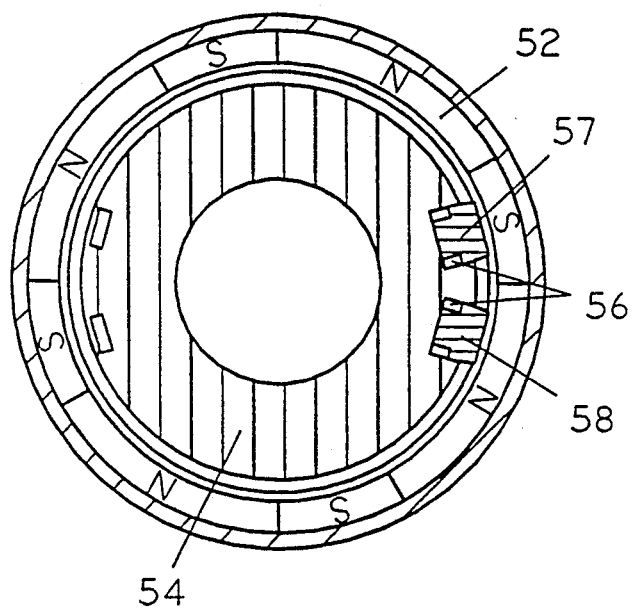
FIG. 5 is a schematic representation of the spindle assembly, as seen in FIG. 4, illustrating the positional arrangement of the means for determining rotor/stator positions of the motor for commutation of the motor.

FIGS. 4 and 5, which are cross-sectional and schematic views taken generally along Line IV—IV of FIG. 2, show the rotor/stator position detection means which provide signal information for commutation of the phase windings of the three-phase VR motor 20. As illustrated in FIG. 5, magnetic ring 52 which is mounted for rotation with rotor 34 has alternating North and South poles of unequal arcuate pole lengths, i.e., 60° and 30°, throughout the 360° extent of the ring. During rotor rotation, the passage of the alternating poles of unequal length are sensed by the two arcuately spaced Hall effect sensors 57, 58 which are fixed against rotation in sensor support ring 54 attached to bolster sleeve insert 53. Sensors 57, 58 are arcuately spaced 30° apart, adjacent the path of rotation of magnetic ring 52.

Details of the use of a magnetic ring having unequal alternating North and South poles to permit communication of a three phase VR motor by the use of only two arcuately spaced sensors form the subject matter of commonly assigned, co-pending application entitled "Improved Apparatus for Communication of an Electric Motor," Ser. No. 07/752,377 filed Aug. 30, 1991 concurrently herewith.

Figure 6:
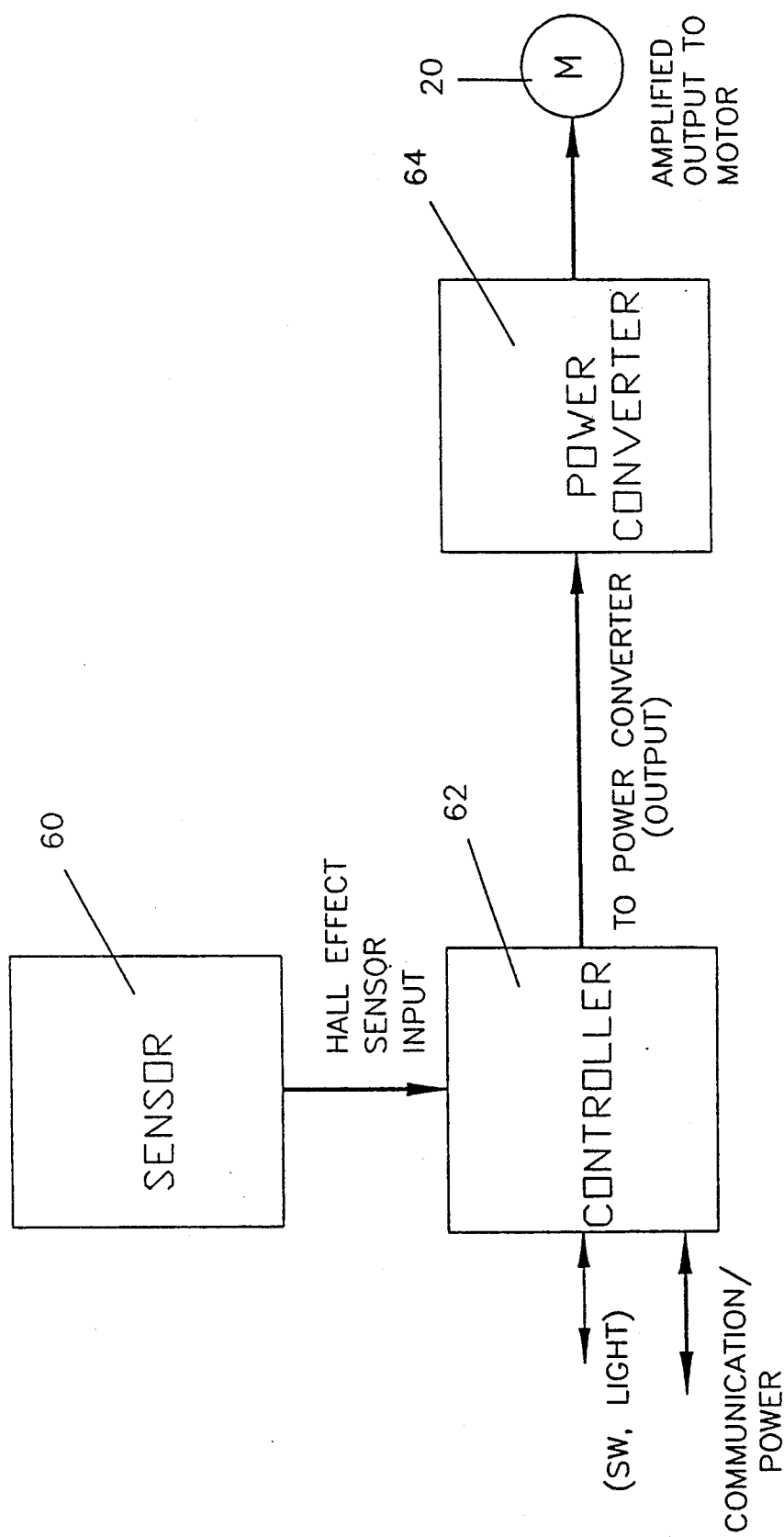
FIG. 6 is an illustrative block diagram showing principal sections of the motor control system of the present invention.

The closed-loop motor control system for operating VR motor 20 may best be described and understood by reference to FIGS. 6 through 9 of the drawings which are block diagrams illustrating operative interconnection of the major sections and components of the control system. As seen in FIG. 6, the control system principally comprises three sections, a sensor section 60 for sensing rotor velocity and stator/rotor position of the motor, a controller section 62, and an amplifier, or power converter, section 64. The component parts of sensor section 60 are located conveniently on current board 24, as seen in FIG. 1. Controller section 62 component parts are located conveniently on circuit board 26, and component parts of power converter section 64 are located on circuit board 22.

Figure 7:
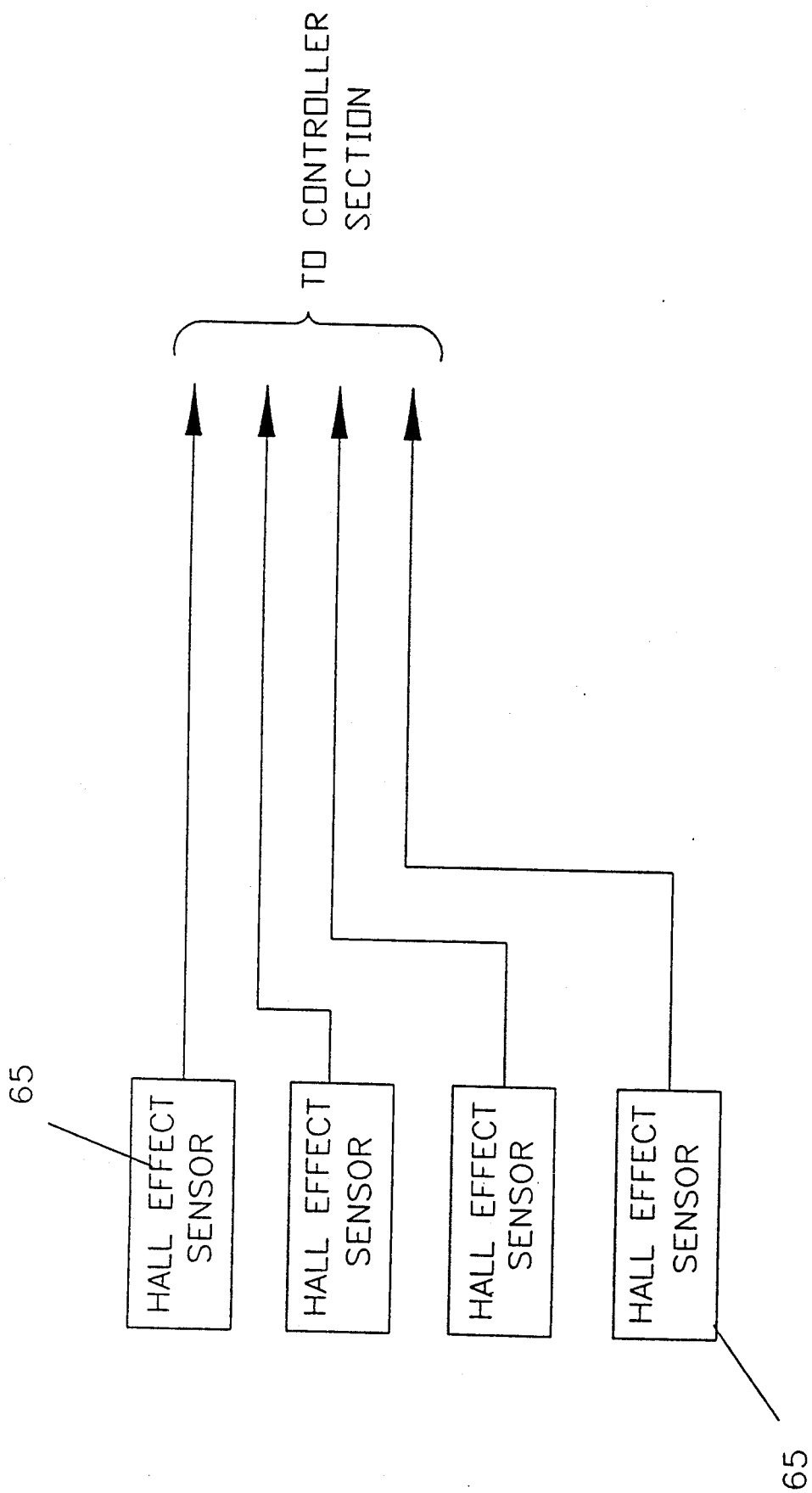
FIG. 7 is an illustrative block diagram showing components of the sensor section of the motor control system shown in FIG. 6.

As seen in FIG. 7, sensor section 60 for detecting velocity and rotor/stator position of the motor during operation contain sensor means, such as four Sprague UGN 3135 U, latched, Hall effect sensors, and four Allen-Bradley RC07 GF332J 3.3 KOHM, ¼ watt resistors for pulling up the open collector output of the sensors. As described, these sensors sense the passage of the alternating North and South poles of the two ring magnets 50, 52 attached to the rotor. One set of two Hall effect sensors in 30° arcuately spaced pockets 55 (one pocket seen in FIG. 2a) sense passage of equal length North and South poles of a 60° pole ring magnet 50 to provide a 120 line quadrature encoder for motor velocity control. The second set of Hall effect sensors 57, 58 (FIGS. 4 and 5) in pockets 56 sense the North and South poles of magnet 52 to provide signals for commumication.

Figure 8:
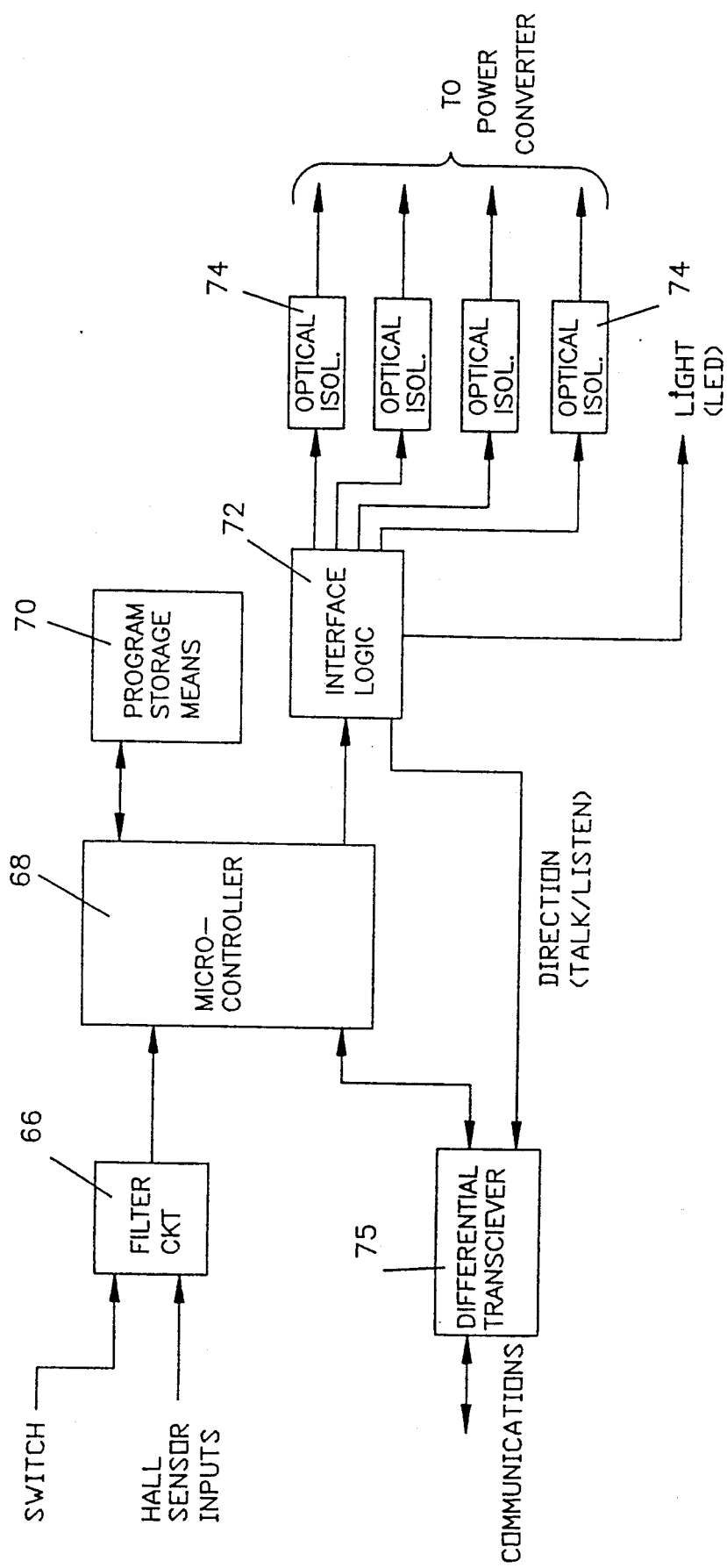
FIG. 8 is an illustrative block diagram showing components of the controller section of the motor control system shown in FIG. 6.

Controller section 62 components, as seen in FIG. 8, include a filter circuit 66 for receiving input signals from the sensor section 60, and for transmitting such signals, after filtering, to a microcontroller 68 which processes and executes a control program supplied thereto from program storage means 70, such as a ROM or EPROM. Process information from microcontroller 68 is processed through an interface logic component 72 and transmitted via optical isolators 74 to power converter section 64 of the control system.

Controller section 62 contains the circuits which perform velocity control, input, output, and communication functions. Typically the filter circuit 66 in this section may comprise four Kemet C315C103M5U5CA 0.01 uF 50 Volt radial lead ceramic capacitors for filtering the incoming Hall effect sensor signals, and a National Semiconductor 74HC14N HEX Schmidt Triggered Inverter for sharpening the edges of the filtered signals from the Hall effect sensors and the output signal from a manual off/on switch 63 (FIG. 1) of the motor 20, such as an ITT-Schadow D602-01 momentary single-pole-single-throw (normally open) push-button switch. The Schmitt Triggered Inverter also buffers the control signal for an indicator light 65 (FIG. 1), such as a Light Emitting Diode.

Microcontroller 68 may be an Intel N80C194 16 bit, 12 MHz microcontroller processor which executes the control program stored in storage means 70, which may be a ROM storage device, such as an Intel N87C257-170V10 latched EPROM.

In the interface logic 72, a National Semiconductor 74HC08N quad AND gate provides multiplexing and interface functions for the output signals from the microcontroller to the four optical isolators 74, which may be Motorola MOC 5008 optical isolators. A National Semiconductor 74HC174N hex D flip flop is connected to the multiplexed address/data bus of the microcontroller 68 in order to latch outputs which control a differential transceiver 76, which may be a National Semiconductor UA 96176 RS-485 transceiver, and the LED 65. Three Allen-Bradley RC07GF332J 10 KOhm ¼ Watt resistors are used to pull up two unused high impedance inputs and to bias the receive data line to a logical one. A Kemet T350B685MO10AS 6.8 uF tantalum 20 Volt radial lead capacitor is usd to provide the power-up reset RC time constant. Two Kemet C315C330K2G5CA 33pF ultra-stable ceramic 200 Volt radial lead capacitors are used in conjunction with a 12.0000 MHz crystal to form the oscillator circuit providing the 12 MHz timebase for the microcontroller. An Allen-Bradley RC07GF121J 120 OHm ¼ watt resistor is used to terminate the differential pair communications line. Eight Kemet C315C104M5U5CA 0.1 uF 50 Volt ceramic radial lead capacitors, one Kemet T350A105M020AS1 uF tantalum 20 Volt radial lead capacitor and one Kemet T350F336M010AS 33 uF tantalum radial lead are used for general decoupling throughout the controller circuit to minimize noise transients.

Figure 9:
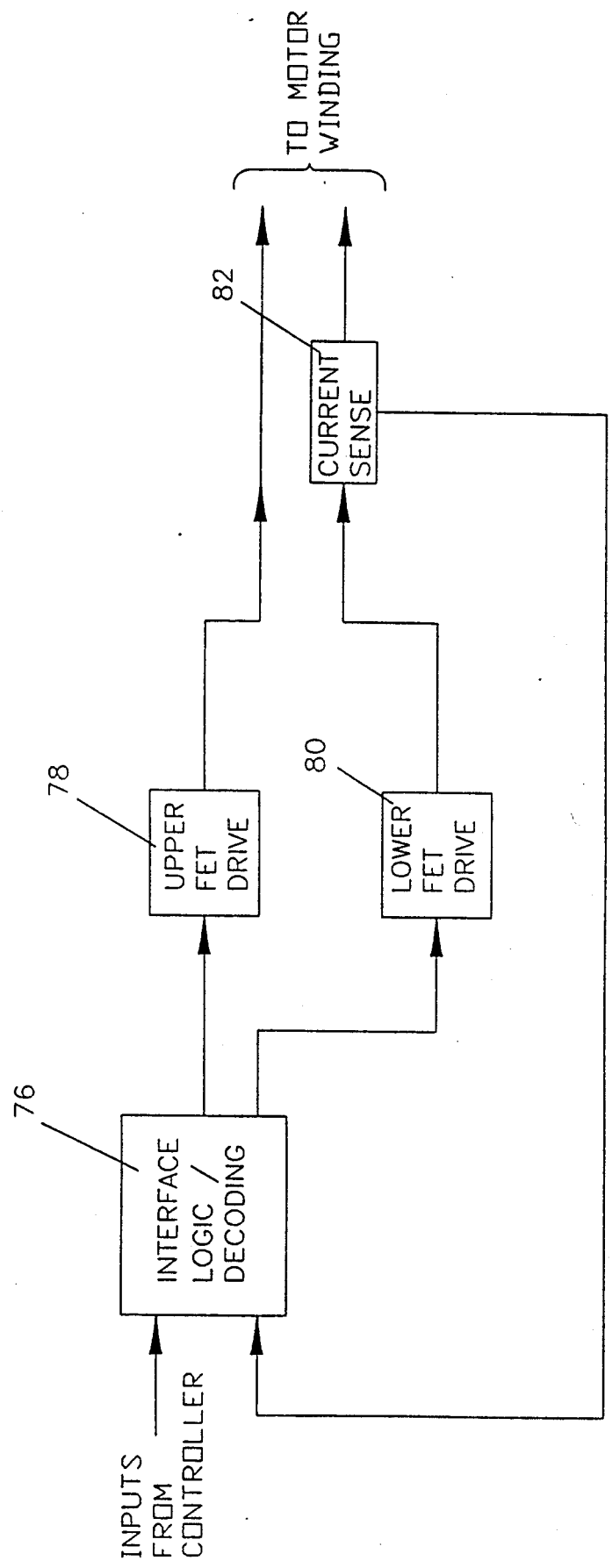
FIG. 9 is an illustrative block diagram showing components of the power converter section of the motor control system shown in FIG. 6.
Figure 10:
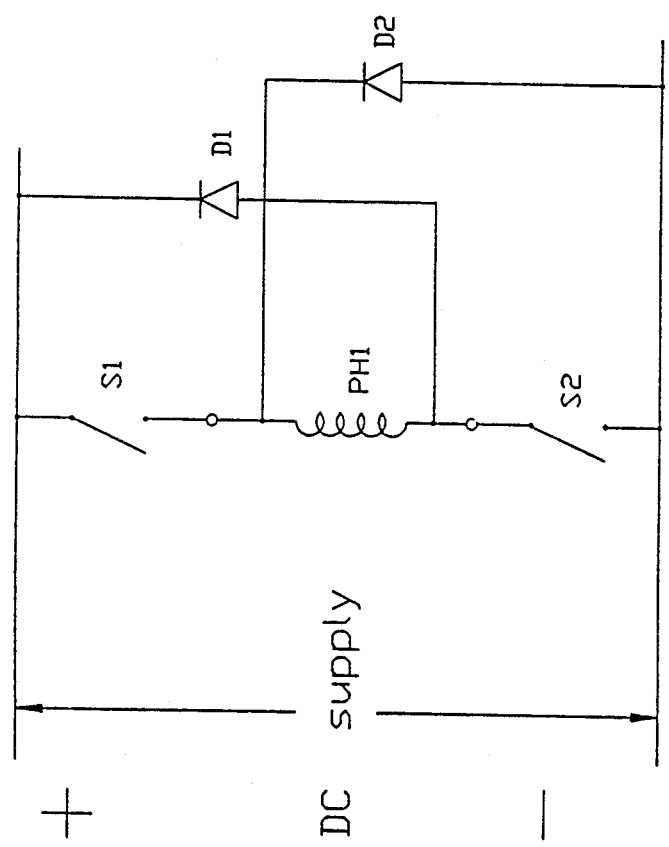
FIG. 10 is an electrical schematic diagram of one of the switch means components of the power converter section of the motor control system showing the switch arrangement for supplying current to one phase winding of the spindle assembly drive motor.

As shown in FIG. 9, inputs from the four optical isolators 74 of the controller section 62 pass through an interface logic/decoder 76 of the power converter section 64 to upper and lower motor winding switch means 78, 80, which may consist of a plurality of field effect transistors each having an associated circuit for turn-on and turn-off. Operation of the switch means supplies current to the three phase windings of VR motor 20. Three of the four optically isolated signals from the controller section 62 control the motor phases directly and interface to a quad OR gate (such as a National Semiconductor 74C02N) in decoder 76 which allows the windings to be turned off in the event of over current. These phase control signals are buffered by a line driver (such as a National Semiconductor 74C240N) in decoder 76 and then operate switches S1 and S2 of each phase winding circuit PH1, as illustrated in FIG. 10. These switches may be three International Rectifier IRF 730 N channel Field Effect Transistors in the lower switch means 80 and three Motorola MTP2P45 P channel switch means (FIG. 9).

Ultra fast recovery diodes D1, D2, such as Motorola MUR 440 diodes, are used as regeneration diodes. They allow the energy stored in the winding to be returned to the supply when the winding is turned off.

The current limit component 82 of the power converter is implemented using four operational amplifiers such as a National Semiconductor LM324N quad operational amplifier integrated circuit. In conjunction with the appropriate commercially available resistors, a voltage, which is proportional to the current in the motor windings, is compared to some reference voltage and an output signal which causes switches S1 and S2 to be turned off is generated if the current in the motor windings exceeds the maximum allowed current.

Figure 5A:
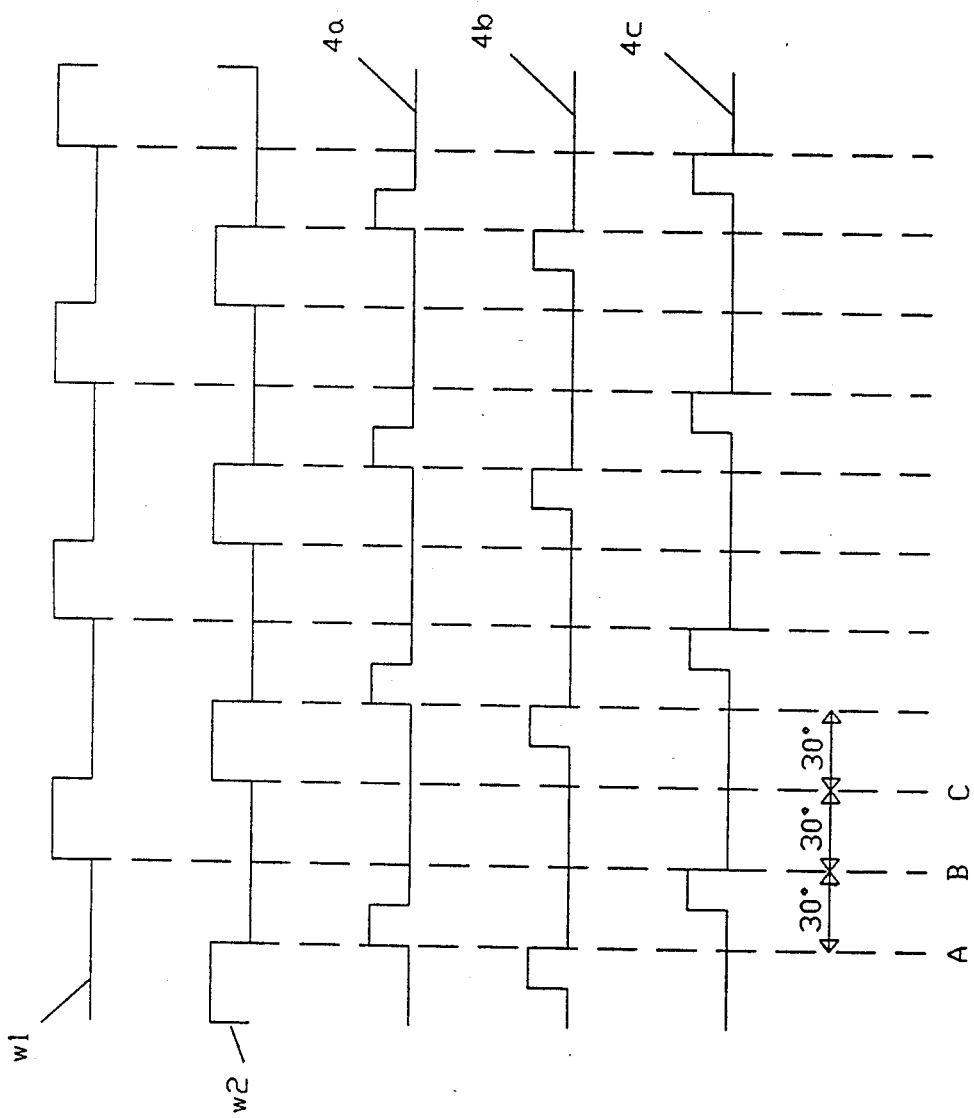
FIG. 5a is a waveform diagram illustrating the conduction angles, or pulse widths, which control the switching of current to one phase of the motor for commutation of the same under varying conditions of phase advance.

FIG. 5a is a waveform diagram illustrating the conduction angles, or pulse widths, which control the switching of current to one phase of the motor for commutation of the same wherein rotor/stator position signal information from two Hall effect sensors, waveforms W1 and W2, provides "windows" of opportunity, e.g., 30° of rotor rotation, for commutation, as seen at A, B, and C. Waveforms 4a, 4b, and 4c for one phase winding of the motor illustrate situations of no-phase advance of the conduction angle, a phase advance in a first, or positive, direction, and a phase advance in an opposite, or negative, direction, respectively.

Motor control information is stored and transferred between different components of the controller section 62. The microcontroller 68 executes a program which is stored in external non-volatile ROM stoage means 70. The microcontroller has an internal volatile storage means, or RAM, which is used to store all variable data. An example of two separate modules of a program which use common information is a proportional integral derivative (PID) filter routine in the ROM for velocity control and a motor efficiency optimization routine in the ROM. The microcontroller inputs to the PID routine are a chosen reference velocity and the actual velocity of the motor, both values being stored in internal RAM memory locations. The output of the PID routine is a value which indicates the required conduction angle necessary to maintain actual velocity substantially equal to the chosen reference velocity for the motor.

After the PID routine has determined the required conduction angle for velocity control and has stored this value in the RAM, the efficiency optimization routine is executed. The inputs to the motor efficiency optimization routine are the present conduction angle and the present phase advance value. Both these values are stored in the RAM. The efficiency optimization routine uses the RAM to store an intermediate sum of conduction angles until a number of sequential conduction angle values have been summed together. This sum then is representative of the average conduction angle over a period of consecutive conduction angle values. The output value of the motor efficiency optimization routine is a new phase advance value which is also stored in the RAM for use by a commutation routine in the control program.

By monitoring the duration of the conduction angle, or pulse width, of signals sent to the switches of a phase, or multiple phases of the motor for commutation, and by adjusting the phase advance of the commutation angle, or pulse width, to minimize the same, optimum efficiency of the motor operation can be maintained.

That which is claimed is:

1. A closed-loop motor control system for maintaining optimum efficiency of operation of an electric motor having one or more phase windings and means for sensing the position of alignment of the poles of the rotor and the stator of the motor and for commutating the phase windings of the motor in response thereto to rotate the rotor and motor shaft, said motor control system comprising:

(a) means for measuring for a conduction angle of a phase energization of the motor at a given speed of operation, (b) means for adjusting the phase advance of the conduction angle of the phase energization of the motor by a selected amount in a positive or a negative direction to obtain a subsequent conduction angle, (c) means for measuring the subsequent conduction angle, (d) means for comparing the measured values of the two sequentially measured conduction angles, (e) means for adjusting the phase advance of the subsequent conduction angle to obtain a subsequent conduction angle thereto by (i) reversing the direction of adjustment of the phase advance of the. subsequent conduction angle by an incremental amount if it is greater than the immediately previously measured conduction angle, (ii) continuing the direction of adjustment of the phase advance of the subsequent conduction angle by an incremental amount if it is less than the immediately previously measured conduction angle, and (iii) adjusting the phase advance in either direction if the subsequent donduction angle is equal to the immediately previously measured conduction angle, and (f) means for continuously repeating functions (c) through (e), inclusive, to facilitate optimum efficiency of operation of the motor at a given speed of operation.

2. A closed-loop motor control system as defined in claim 1 wherein the means for adjusting the phase advance of the subsequent conduction angle to obtain a subsequent conduction angle thereto by adjusting the phase advance in either direction if the subsequent conduction angle is equal to the immediately previously measured conduction angle comprises means for continuing the direction of adjustment of the phase advance of the subsequent conduction angle by an incremental amount.

3. A closed-loop motor control system as defined in claim 1 wherein the means for adjusting the phase advance of the subsequent conduction angle to obtain a subsequent conduction angle thereto by adjusting the phase advance in either direction if the subsequent conduction angle is equal to the immediately previously measured conduction angle comprises means for reversing the direction of adjustment of the phase advance of the subsequent conduction angle by an incremental amount.

4. A method of maintaining optimum efficiency of operation of an electric motor having one or more phase windings and means for sensing the position of alignment of the poles of the rotor and the stator of the motor and for commutating the phase windings of the motor in response thereto comprising the steps of:

(a) measuring the conduction angle of a phase energization of the motor at a given speed of operation, (b) adjusting the phase advance of the conduction angle of the phase energization of the motor by a selected amount in a positive or a negative direction to obtain a subsequent conduction angle, (c) measuring the subsequent conduction angle, (d) comparing the measured values of the two sequentially measured conduction angles, (e) adjusting the phase advance of the subsequent conduction angle to obtain a subsequent conduction angle thereto by (i) reversing the direction of adjustment of the phase advance of the subsequent conduction angle by an incremental amount if it is greater than the immediately previously measured conduction angle, (ii) continuing the direction of adjustment of the phase advanced of the subsequent conduction angle by an incremental amount if it is less than the immediately previously measured conduction angle, and (iii) adjusting the phase advance in either direction if the subsequent conduction angle is equal to the immediately previously measured conduction angle, and (f) repeating steps (c) through (e), inclusive, to facilitate optimum efficiency of operation of the motor at a given speed of operation.

5. a method as defined in claim 4 wherein the step of adjusting the phase advance of the subsequent conduction angle to obtain a subsequent conduction angle thereto by adjusting the phase advance in either direction if the subsequent conduction angle is equal to the immediately previously measured conduction angle comprises this step of continuing the direction of adjustment of the phase advance of the subsequent conduction angle by an incremental amount.

6. a method as defined in claim 4 wherein the step of adjusting the phase advance of the subsequent conduction angle to obtain a subsequent conduction angle thereby by adjusting the phase advance in either direction if the subsequent conduction angle is equal to the immediately previously measured conduction angle comprises the step of reversing the direction of adjustment of the phase advance of the subsequent conduction angle by an incremental amount.

7. A method as defined in claim 4 wherein conduction angle of a single phase of the electric motor is continuously measured in carrying out the method therein defined.

8. A method as defined in claim 4 wherein the conduction angles of every phase of a multi-phase electric motor are measured in carrying out the method therein defined.

9. A closed-loop motor control system for maintaining optimum efficiency of operation of an electric motor having one or more phase windings and means for sensing the position of alignment of the poles of the rotor and the stator of the motor and for commutating the phase windings of the motor in response thereto to rotate the rotor and motor shaft, said motor control system comprising:

(a) means for continuously measuring a conduction angle of a phase energization of the motor at a given speed of operation and for storing consecutive conduction angle measurements, (b) means for continuously comparing the values of the last two consecutive conduction angle measurements, and (c) means for continuously adjusting the phase advance of the conduction angle of the phase energization of the motor by a selected amount in a positive or a negative direction in response to said conduction angle measurement comparisons to obtain subsequent conduction angles thereto by (i) reversing the direction of adjustment of the phase advance of a subsequent conduction angle by an incremental amount if its measurement is greater than the immediately preceding conduction angle measurement, (ii) continuing the direction of adjustment of the phase advance of the subsequent conduction angle by an incremental amount if its measurement is less than the immediately preceding conduction angle measurement, and (iii) adjusting the phase advance of the subsequent conduction angle by an incremental amount in either direction if its measurement is equal to the immediately preceding conduction angle measurement, whereby optimum efficiency of operation of the motor at a given speed of operation is facilitated.

10. A closed-loop motor control system as defined in claim 9 wherein said means for continuously adjusting the phase advance of the conduction angle to obtain subsequent conduction angles by adjusting the phase advance of the subsequent conduction angle by an incremental amount in either direction if its measurement is equal to the immediately preceding conduction angle measurement comprises means for continuing the direction of adjustment of the phase advance of the subsequent conduction angle by an incremental amount.

11. A closed-loop motor control system as defined in claim 9 wherein said means for continuously adjusting the phase advance of the conduction angle to obtain subsequent conduction angles by adjusting the phase advance of the subsequent conduction angle by an incremental amount in either direction if its measurement is equal to the immediately preceding conduction angle measurement comprises means for reversing the direction of adjustment of the phase advance of the subsequent conduction angle by an incremental amount.

* * * * *

UNITED STATES PATENT AND TRADEMARK OFFICE
CERTIFICATE OF CORRECTION

PATENT NO. : 5,168,202
DATED : December 1, 1992
INVENTOR(S) : Scott G. Bradshaw, et al It is certified that error appears in the above-indentified patent and that said Letters Patent is hereby corrected as shown below:

In column 6, lines 17 and 18, change "communication" (divided) to:

--commutation--

In column 6, line 21, change "Communication" to:

--Commutation--

In column 6, line 22, change "07/752,377" to:

--07/752,734--

In column 9, line 36, change "donduction" to:

--conduction--

In column 10, line 19, change "advanced" to:

--advance--

Signed and Sealed this

Twelfth Day of October, 1993

Attest:

BRUCE LEHMAN

*Attesting Officer*         *Commissioner of Patents and Trademarks*